United States Patent [19]

Tuovinen et al.

[11] Patent Number: 4,946,811

[45] Date of Patent: Aug. 7, 1990

[54] METHOD FOR MIXING MOLTEN IRON SILICATE WITH FERROALLOY SLAG IN ORDER TO PRODUCE FIRE-RESISTANT AND CHEMICALLY RESISTANT FIBER

[75] Inventors: Frans H. Tuovinen, Kuusitie; Aarno T. Salervo, Tapionkatu, both of Finland

[73] Assignee: Outokumpu Oy, Helsinki, Finland

[21] Appl. No.: 399,537

[22] PCT Filed: Nov. 18, 1988

[86] PCT No.: PCT/FI88/00187

§ 371 Date: Aug. 17, 1989

§ 102(e) Date: Aug. 17, 1989

[87] PCT Pub. No.: WO89/04812

PCT Pub. Date: Jun. 1, 1989

[30] Foreign Application Priority Data

Nov. 27, 1987 [FI] Finland ................ 875237

[51] Int. Cl.$^5$ .............. C04B 5/06; C21C 7/00
[52] U.S. Cl. .................. 501/155; 106/789

[58] Field of Search .......... 501/155, 28; 106/128, 106/117; 75/24, 30, 73, 74, 82, 51.5, 51.6, 10.63, 10.61

[56] References Cited

U.S. PATENT DOCUMENTS

| | | | |
|---|---|---|---|
| 4,365,984 | 12/1982 | Gee | 501/155 |
| 4,751,208 | 6/1988 | Aoki et al. | 501/155 |
| 4,818,289 | 4/1989 | Mäntymäki | 501/155 |
| 4,818,290 | 4/1989 | Tuovinen | 501/155 |

FOREIGN PATENT DOCUMENTS 2288138 12/1987 Japan .

*Primary Examiner*—William R. Dixon, Jr.
*Assistant Examiner*—Sue Hollenbeck
*Attorney, Agent, or Firm*—Brooks, Haidt, Haffner & Delahunty

[57] ABSTRACT

The present invention relates to a method for preparing iron silicate slags, by means of mixing with ferroalloy slag, to a molten slag which can be defibrated into fire-resistant and chemically resistant fibers. The advantageous composition for the molten slag is 15–25% Fe, 45–69%, $SiO_2$, 0–5% CaO, 4–10% MgO, 5–15% $Al_2O_3$ and 0.5–3% Cr (percentages by weight).

5 Claims, No Drawings

METHOD FOR MIXING MOLTEN IRON SILICATE WITH FERROALLOY SLAG IN ORDER TO PRODUCE FIRE-RESISTANT AND CHEMICALLY RESISTANT FIBER

The present invention relates to a method for processing iron silicate slags, by mixing with ferroalloy slag, to slag melt which can be defibrated into fire-resistant and chemically resistant high-quality fibers mainly for industrial use. The employed ferroalloy slag is ferrochromium slag or other slag of the similar type.

The utilization of slags, obtained as by-products from metal processes, for manufacturing slag wool is generally known. In industrial-scale production, the raw material is nearly always blast furnace slag. The smelting of the raw material mixture is generally carried out in a cupola furnace by means of coke, the defibration takes place in a four-wheel centrifugal machine and the typical manufactured products are heat insulation materials used in building.

Iron silicate slags have not been used as raw materials in the production of fiber products, irrespective of the many advantages and possibilities offered by these slags. This has mainly been due to the restrictions of the smelting unit, i.e. the cupola furnace, of the fiber production process. The fact is that the coke used in cupola furnace smelting tends to reduce the iron contained in the raw materials to metal, which leads to disturbances in the defibration process. There are also set limits to the grain size of the raw materials to be smelted in a cupola furnace: the raw materials must be in bulk size, and finely divided materials cannot be used. The reason for this is that the material bed to be smelted must be gas-permeable.

Electric furnace smelting, which during the past years has been adopted to fiber production, too, is changing the situation and has enabled the utilization of new raw materials, for instance the said iron silicate slags. The use of an electric furnace in the defibration of slag melt is introduced for instance in the FI patent 72502. Among the advantages of an electric furnace in the treatment of iron silicate melts, in addition to the fact that the creation of metallic iron is prevented, let us mention the possibility to controllably adjust the degree of oxidation of the iron contained in the melt which has a remarkable effect on the properties of the slag melt to be defibrated. If desired, it is possible to feed for instance iron silicate slag into an electric furnace in molten state, which may be very important from the economical point of view.

Iron silicate slags are created in the metallurgical industry for instance as by-products of copper and nickel processes. These slags differ from the rest of the common slag types particularly because of their high iron content. The slags may contain iron even 40% by weight. In addition to this, they are often finely granulated.

The use of iron silicate slags in fiber production is known from the FI patent application 845114, corresponding to U.S. Pat. No. 4,818,289. The said patent application discloses two ways for mixing iron silicate slag, so that the properties of the slag melt are changed by adding acidic mixing agents. According to this patent application, in order to manufacture fiber with a high heat resistance, an addition of 25–35% by weight $SiO_2$ is mixed in the slag. In order to manufacture fiber with a lower heat resistance, an addition of 8–15% by weight $Al_2O_3$ and 15–25% by weight $SiO_2$ is mixed in the slag.

However, in practical defibration tests, where the aim was to produce a high-temperature resistant and chemically resistant fiber from iron silicate slags, it was observed that the slag melts produced according to the above described patent were defibrated in an unsatisfactory fashion. In order to achieve a high-quality fiber product, the iron silicate slag must be mixed to an essentially larger extent and with different mixing agents.

The present invention introduces an improved method for mixing iron silicate slag, which is essentially different from the method disclosed in U.S. Pat. No. 4,818,289, both as regards the used mixing agents and the supplied amounts. The chemical composition of the slag melt obtained as the result of the process is different, and its defibration properties are remarkably better. The obtained product is a slag melt which can be processed, by means of generally known defibration methods, into a high-temperature resistant and chemically resistant fiber.

The invention is based on the mixing of iron silicate slag with ferroalloy slag. Ferrochromium slag for instance is chromium-bearing magnesium-aluminium-silicate, which is created in the production of metallic ferrochromium. Mixing with ferrochromium slag brings about remarkable advantages which are connected to the defibration capacity of the mixed slag melt, and to the properties of the end product. Apart from ferrochromium slag, ferrosilicon chromium slag, for example, can be used in the mixing as well.

In the method of the invention, iron silicate slag is mixed with for instance ferrochromium slag and some $SiO_2$ bearing agent (for example arenaceous quartz) so that the $Al_2O_3$ content of the final mixed slag is 5–15% by weight, the MgO content 4–10% by weight and the alkalinity of the final slag in molar percentages is $(FeO+CaO+MgO)/(SiO_2+Al_2O_3)=0.5–0.7$.

Now, when using raw materials which are typical in their chemical composition, the composition range of the slag melt to be defibrated, as well as that of the end-product fiber, is: Fe 15–25%, $SiO_2$ 45–60%, CaO 0–5%, MgO 4–10%, $Al_2O_3$ 5–15%, and Cr 0.5–3% (percentages by weight). The total amount of the supplied mixing agents is typically 43–56% of the amount of the final slag melt.

The smelting and mixing of the raw materials is carried out in an electric furnace, so that the degree of oxidation of the slag melt to be defibrated can be controllably adjusted.

Generally speaking, the purpose of the mixing process is first of all to change the properties of iron silicate slag to be better suited for fibration. This means that the temperature dependency of the slag viscosity is weakened when approaching the melting point of the slag, that the glazing capacity of the slag is improved, the surface tension reduced and the melting point of the slag adjusted to be suitable. The increasing of the acidity of the slag enhances all of the above mentioned aims. Secondly, the purpose of the mixing is to achieve the desired characteristics for the final product: high-temperature resistance and chemical resistance.

The invention is explained below with reference to the appended phase diagrams, where FIG. 1 is the phase diagram of the system $Fe-SiO_2$, FIG. 2 is the phase diagram of the system $FeO.-Fe_2O_3-SiO_2$, and FIG. 3 is the phase diagram of the system $FeO$-$SiO_2$-$Al_2O_3$.

The phase diagrams are extracted from the book Muan A. et al: "Phase Equilibria among Oxides in Steelmaking", Addison-Wesley Publishing Company, Inc., 1965, pages 62 and 116. The difficulty of making iron silicate melt more acidic by mixing is clearly apparent from the phase diagrams 1 and 2. When the $SiO_2$ content of the slag is increased, the melting point of the slag also rises extremely sharply while the melt is saturated with $SiO_2$. The larger the part of the iron in the melt that is in the form of $Fe^{3+}$, the smaller the $SiO_2$ content needed to achieve the saturation limit. When operating near the saturation limit, the physical properties of the slag melt are strongly changed along with the slightest changes in the temperatures or composition of the melt. This property makes slag melt poorly suitable for defibration. Moreover, in order to achieve the desired acidity, very high temperatures must be used, in which case there is also the danger that the slag melt is decomposed into two non-soluble components of the melt.

The above described difficulties can be overcome by means of the ferroalloy slag mixing process according to the present invention. The MgO and $Al_2O_3$ contained in the ferrochromium slag shift the saturation limit higher and allow the slag to be mixed to the acidity required by defibration at a lower temperature than in the case of mixing merely with $SiO_2$. The ferroalloy slag addition also decreases the temperature dependence of the viscosity of the mixed slag and increases the stability of the silicate melt and the produced fiber.

The effects of the $Al_2O_3$ addition as such, brought about by the ferrochromium slag, can be examined by observing the phase diagram of the $FeO$-$SiO_2$-$Al_2O_3$ system, FIG. 3. In the diagram there are indicated the initial composition of a typical iron silicate slag (point A), the slag composition mixed to 0.6 alkalinity by means of a mere $SiO_2$ addition (point B), as well as the slag composition raised up to 0.6 alkalinity by means of adding both ferrochromium slag (24% of the amount of iron silicate slag) and some $SiO_2$ bearing agent (point C), as well as, for the sake of comparison, also the slag content achieved by means of mixing with the 35% $SiO_2$ addition described in the U.S. Pat. No. 4,818,289 (point D). It is apparent from the diagram that the difference in melting points between points B and C is more than 100° C. In the defibration tests that were carried out, the slag melt prepared according to the present invention was essentially better defibrated than the slag melt according to the U.S. Pat. No. 4,818,289 which was manifested as an improved yield from slag melt to fiber, a lower shot content in the fiber product and as longer fibers.

The heat resistance of the fibers made of the slag melt prepared according to the present invention is essentially better than that of any known slag fiber. This must be partly due to the chromium oxide added along with the ferrochromium slag mixing.

The obtained fibers also endure strongly alkalic or acidic conditions remarkably better than other slag fibers or mineral fibers. One reason for this is that the $K_2O$, $Na_2O$ and CaO contents of the raw materials of the fiber production, and naturally those of the fiber itself, are very low and the Fe contents high.

The mixing method of the invention is illustrated below by means of the following examples.

EXAMPLE 1

The composition of an iron silicate slag created in the production of nickel is: Fe 41.5%, $SiO_2$ 29.5%, CaO 1.5%, MgO 6.5% and $Al_2O_3$ 4.1%. The composition of ferrochromium slag is for instance: Fe 4.4%, Cr 8.9%, $SiO_2$ 29.6%, CaO 3.1%, MgO 25.9% and $Al_2O_3$ 22.7%. (All percentages are percentages by weight).

In order to achieve a well defibrating slag melt, the iron silicate slag must, according to the present invention, be mixed with ferrochromium slag and arenaceous quartz ($SiO_2$ content 90%). When the ferrochromium slag addition is 12% and the arenaceous quartz addition 38% of the total amount of the final slag mixture, the obtained composition for the mixed slag is: Fe 21.7%, Cr 1.1%, $SiO_2$ 52.5%, CaO 1.4%, MgO 6.5% and $Al_2O_3$ 6.9%. The molar alkalinity of the slag is 0.6.

EXAMPLE 2

The composition of an iron silicate slag created in the production of copper is: Fe 43.3%, $SiO_2$ 29.1%, CaO 2.8%, MgO 2.1% and $Al_2O_3$ 3.1%. The composition of ferrochromium slag and arenaceous quartz is the same as in example 1.

In order to achieve a well defibrating slag melt, the iron silicate slag must, according to the present invention, be mixed with 17.5% ferrochromium slag and 32.5% arenaceous quartz of the weight of the final slag mixture. Thus the obtained composition for the mixed slag is Fe 22.7%, Cr 1.6%, $SiO_2$ 49.0%, CaO 2.1%, MgO 5.7% and $Al_2O_3$ 7.4%. The molar alkalinity of the slag is 0.65.

We claim:

1. A method for preparing iron silicate bearing slag melt for producing fire-resistant and chemically resistant fiber materials, comprising improving the defibrating capacity, fire-resistance and chemical resistance of the slag by: mixing the iron silicate slag with $SiO_2$ as well as ferroalloy slag so that the composition of the slag melt to be defibrated is adjusted to be within the range of 15–25% Fe, 45–60% $SiO_2$, 0–5% CaO, 4–10% MgO, 5–15% $Al_2O_3$ and 0.5%–3% Cr (percentages by weight).

2. The method of claim 1, characterized in that the ferroalloy slag is ferrochromium slag.

3. The method of claim 1, characterized in that the ferroalloy slag is ferro-silicon-chromium slag.

4. The method of claim 1, characterized in that the molar alkalinity of the slag melt to be defibrated $(FeO+CaO+MgO)/(SiO_2+Al_2O_3)$ is adjusted within the range of 0.5–0.7.

5. The method of claim 1, characterized in that smelting and mixing of the slag melt is carried out in an electric furnace.

* * * * *